United States Patent
Sharar et al.

(10) Patent No.: US 11,002,759 B2
(45) Date of Patent: May 11, 2021

(54) HIGH-SENSITIVITY, LOW THERMAL DEFLECTION, STRESS-MATCHED ATOMIC FORCE MICROSCOPY AND SCANNING THERMAL MICROSCOPY PROBES

(71) Applicant: U.S. Army Research Laboratory, Adelphi, MD (US)

(72) Inventors: Darin J. Sharar, Silver Spring, MD (US); Adam A. Wilson, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/565,562

(22) Filed: Sep. 10, 2019

(65) Prior Publication Data

US 2021/0072283 A1 Mar. 11, 2021

(51) Int. Cl.
*G01Q 60/38* (2010.01)
*G01Q 70/14* (2010.01)

(52) U.S. Cl.
CPC ............. *G01Q 60/38* (2013.01); *G01Q 70/14* (2013.01)

(58) Field of Classification Search
CPC ........ G01Q 60/24; G01Q 60/32; G01Q 60/36; G01Q 60/58; G01Q 70/00; G01Q 70/08; G01Q 70/14; G01Q 70/16; G01Q 60/38
See application file for complete search history.

(56) References Cited

U.S. PATENT DOCUMENTS

| | | | |
|---|---|---|---|
| 5,804,709 A | 9/1998 | Bourgoin et al. | |
| 6,185,992 B1* | 2/2001 | Daniels | G01Q 30/10 250/307 |
| 6,189,374 B1 | 2/2001 | Adderton et al. | |
| 6,215,137 B1* | 4/2001 | Suzuki | G01Q 60/58 257/254 |
| 6,330,824 B1* | 12/2001 | Erie | G01B 5/28 73/105 |
| 6,871,527 B2 | 3/2005 | Hansma et al. | |
| 7,913,544 B1* | 3/2011 | Chand | G01Q 70/16 73/105 |
| 2004/0020279 A1* | 2/2004 | Degertekin | B82Y 35/00 73/105 |
| 2008/0181861 A1* | 7/2008 | Jiang | C09D 5/1637 424/78.09 |
| 2011/0038392 A1* | 2/2011 | Ando | G01N 25/18 374/16 |
| 2014/0331368 A1* | 11/2014 | Cannara | G01Q 10/045 850/53 |
| 2015/0247881 A1* | 9/2015 | Su | G01Q 30/06 850/1 |
| 2017/0102407 A1* | 4/2017 | Baur | G01Q 10/06 |

* cited by examiner

*Primary Examiner* — David E Smith
(74) *Attorney, Agent, or Firm* — Alan I. Kalb

(57) ABSTRACT

A scanning probe microscope includes a cantilever structure; and a metallization layer on the cantilever structure. The cantilever structure and the metallization layer expand and contract at equivalent rates upon thermal loading. The cantilever structure and the metallization layer may include matching coefficient of thermal expansion levels. The cantilever structure may include SiN. The metallization layer may include 50 nm of Ti. The metallization layer may include 50 nm of Cr. The metallization layer may include 5 nm of Ti and 45 nm of Ge. The cantilever structure may include no thermally-induced deflections.

8 Claims, 10 Drawing Sheets

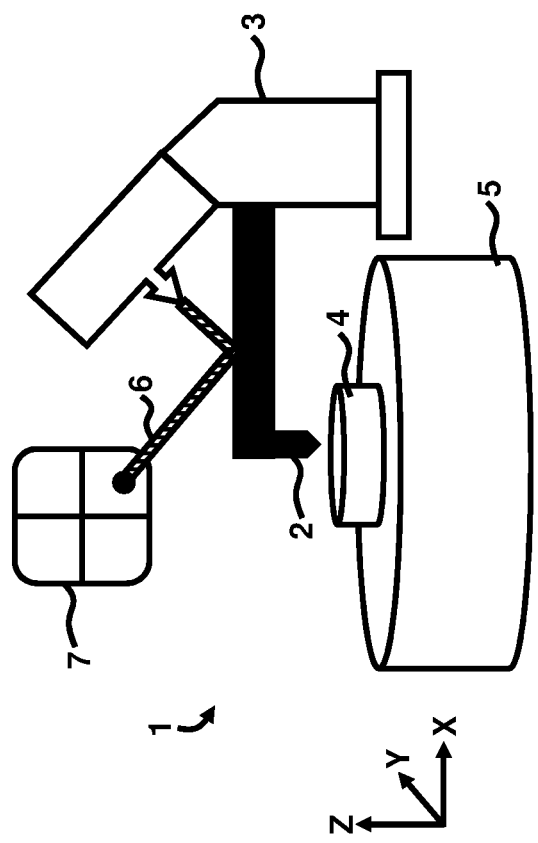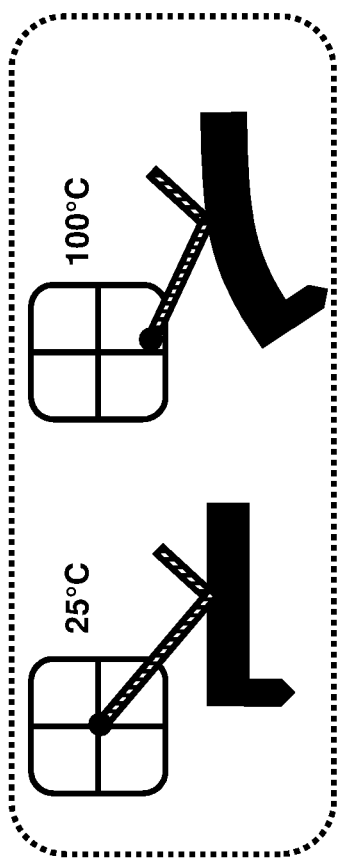

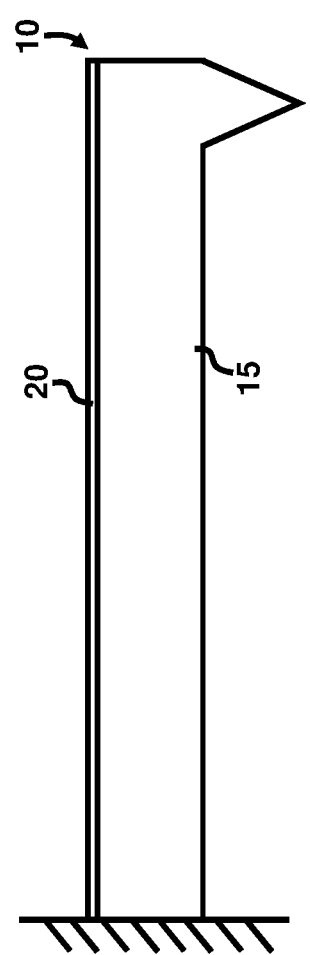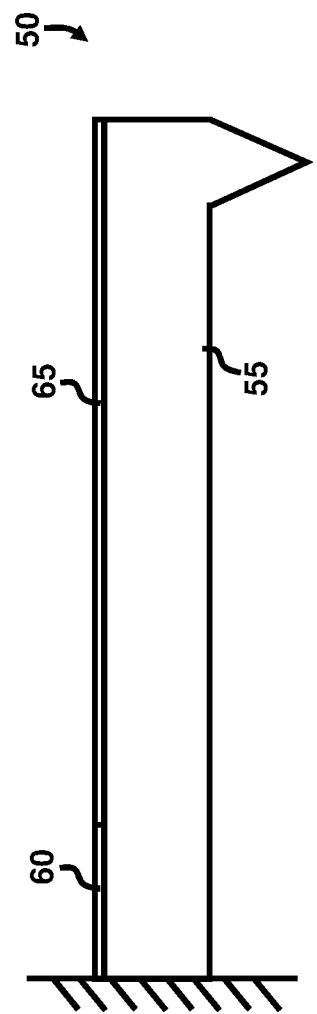

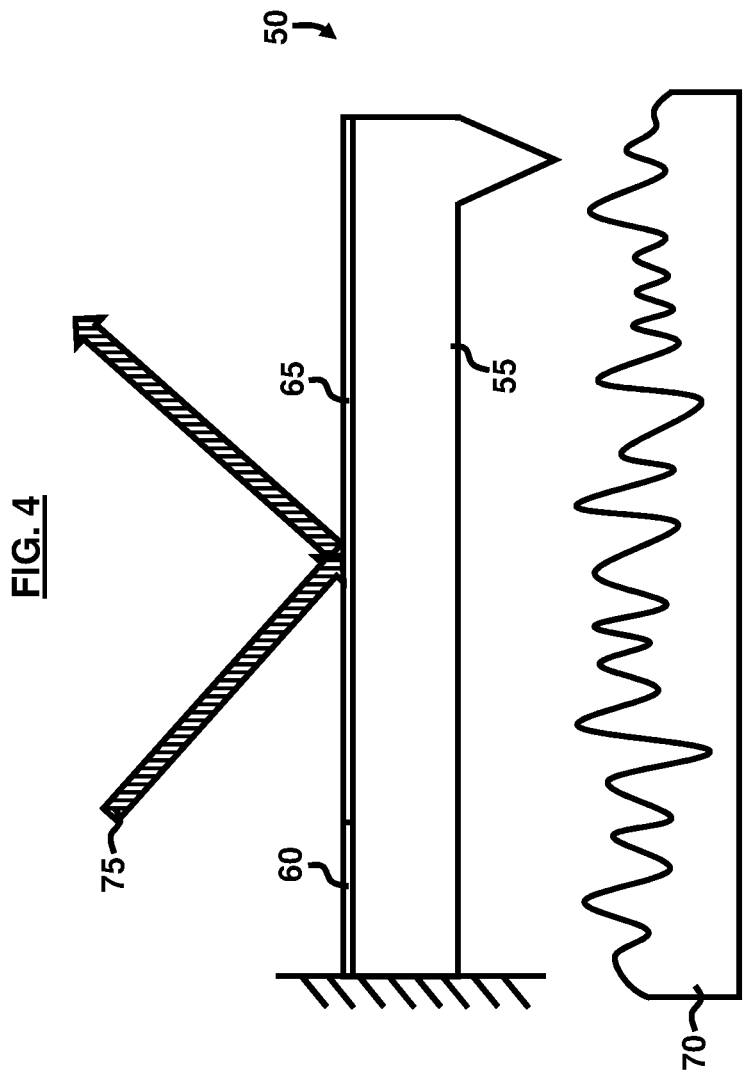

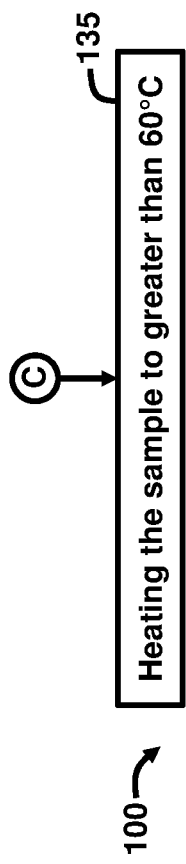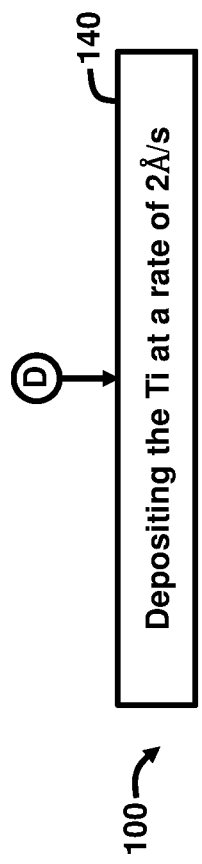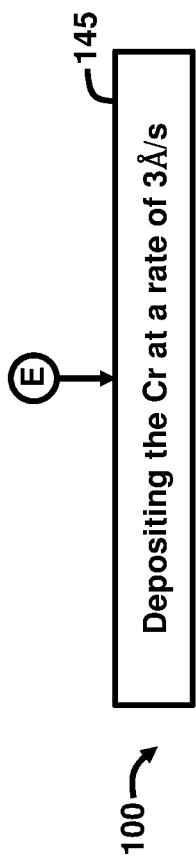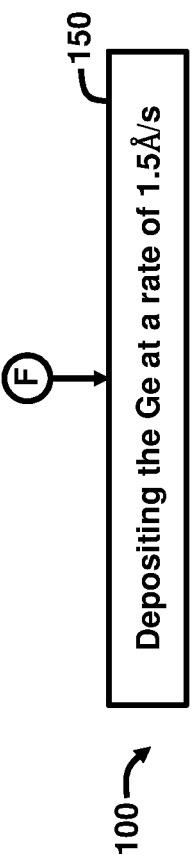

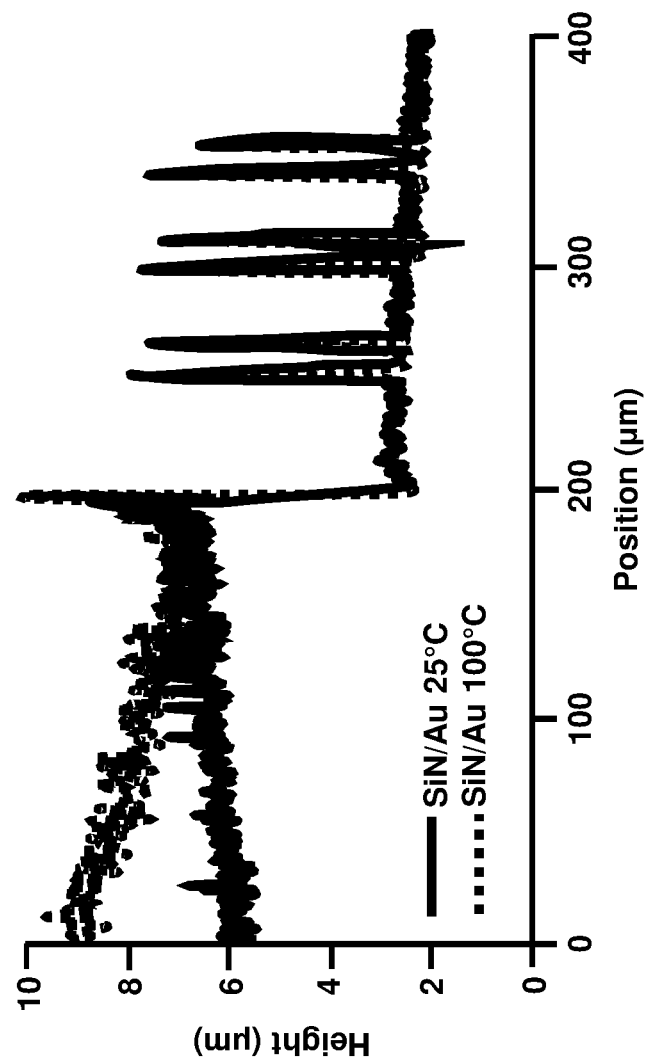

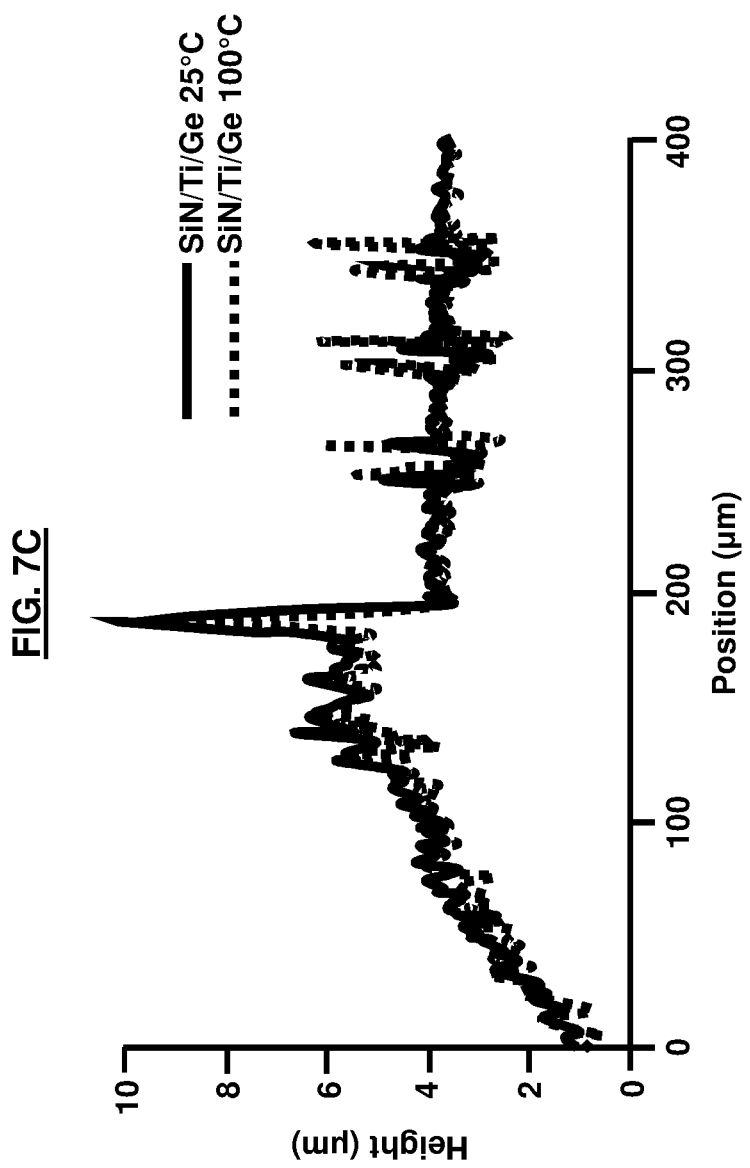

HIGH-SENSITIVITY, LOW THERMAL DEFLECTION, STRESS-MATCHED ATOMIC FORCE MICROSCOPY AND SCANNING THERMAL MICROSCOPY PROBES

GOVERNMENT INTEREST

The embodiments herein may be manufactured, used, and/or licensed by or for the United States Government without the payment of royalties thereon.

CROSS-REFERENCE TO RELATED APPLICATION(S)

This application claims the benefit of U.S. Provisional Patent Application No. 62/730,147 filed on Sep. 12, 2018, which is incorporated herein by reference in its entirety.

BACKGROUND

Technical Field

The embodiments herein generally relate to scanning probe microscopy (SPM), and more particularly to SPM probes having temperature-driven stress formations.

Description of the Related Art

The need to experimentally quantify and resolve thermal and/or mechanical nano-scale properties has increased with the proliferation of micro- and nano-electromechanical systems (NEMS/MEMS). Scanning probe microscopy (SPM) methods, including both Atomic Force Microscopy (AFM) and Scanning Thermal Microscopy (SThM), have been developed to meet these general needs near room temperature. New applications require evaluation of these properties at elevated and sub-ambient temperature. Unfortunately, due to the difference in the coefficient of thermal expansion between the metal and dielectric materials typically comprising the bi-morph structures used for SPM cantilevers, elevated temperatures result in significant (>2 µm) stress-gradients and deflections as one material expands more than the other. In the case of AFM probes, the large-area metal cladding is necessary to provide adequate reflectivity for the laser measurement system. For SThM probes, metallization serves the dual purpose of reflectivity and electrical interconnect.

These temperature-driven stress formations and cantilever deflections result in a varying angle of incidence for the laser positioning source and an apparent change in position of the cantilever, as measured by the position-sensitive photo detector (PSPD). This effect may bottom-out the signal at the detector and prevent the collection of meaningful data at high temperature, often times limiting the range of the sample temperature in a single scan to less than 60° C. FIG. 1A shows a schematic representation of a standard AFM test apparatus 1 and FIG. 1B shows a representation of the undesirable thermal deflection effect, as described above. The apparatus 1 comprises an AFM probe 2, whose position (X,Y,Z) is controlled by a piezo-controlled position controller 3. The AFM probe 2 may scan a sample 4, whose motion (X,Y position) may be controlled by a motor 5. A positioning laser 6 may be used to deflect off the AFM probe 2 onto a PSPD 7 to measure positional changes of the AFM probe 2 as it scans the sample 4. During operation, the AFM probe 2 is brought into contact with the sample 4 via the piezo-controlled position controller 3 and the motor 5. When contact is made, the AFM probe 2 deflects and the incident laser 6 is deflected. Based on a known spring constant of the AFM probe 2, an understanding of the topography of the sample 4 and thermal and/or mechanical nano-scale properties can be determined. However, if the AFM probe 2 and/or sample 4 are heated or cooled, then the AFM probe 2 deflects, which can cause inaccuracies in the scanning process, and thus inaccuracies in the topography, thermal, and/or mechanical nano-scale properties that are being measured.

Some conventional solutions have identified the deflection problem, but have generally accepted this negative response as an inherent limitation for operation. See, for example, U.S. Pat. Nos. 5,804,709; 6,189,374; and 6,871,527, the complete disclosures of which, in their entireties, are herein incorporated by reference. One conventional technique utilizes a small gold pad at the distal end of a cantilever to reduce probe bending. By reducing the total length of the Au—SiN in these probes, the deflection is reduced at elevated or sub-ambient temperatures. However, this approach does not entirely eliminate deflection (particularly at large temperature differences), reduces the range of sensitivity of topographically-induced probe deflection (i.e., normal operating mode for AFM) due to the relatively small area covered by reflective metal, and adds significant complexity and cost to the manufacturing process. These limitations apply equally to SPM, AFM, and SThM probes. Furthermore, the conventional technique does nothing to prevent deflection due to metal interconnects in SThM probes, which must have large length/area electrical interconnects. Accordingly, a new type of probe is needed to overcome the aforementioned limitations of the conventional solutions.

SUMMARY

In view of the foregoing, an embodiment herein provides a scanning probe microscope comprising a cantilever structure; and a metallization layer on the cantilever structure, wherein the cantilever structure and the metallization layer expand and contract at equivalent rates upon thermal loading. The cantilever structure and the metallization layer may comprise matching coefficient of thermal expansion levels. The cantilever structure may comprise SiN. The metallization layer may comprise 50 nm of Ti. The metallization layer may comprise 50 nm of Cr. The metallization layer may comprise 5 nm of Ti and 45 nm of Ge. The cantilever structure may comprise no thermally-induced deflections.

Another embodiment provides an atomic force microscope comprising a cantilever beam; a piezoelectric element to generate an oscillation of the cantilever beam; and a dielectric material on the cantilever beam, wherein the dielectric material is thermally stress-matched to the cantilever beam, and wherein the cantilever beam does not bend during thermal loading caused by the oscillation. The cantilever beam and the dielectric material may expand at equivalent rates upon thermal loading. The cantilever beam and the dielectric material may contract at equivalent rates upon thermal loading. The dielectric material may comprise any of Al, Ag, Au, Cu, Cd, Cr, Ge, Hf, Ir, Ni, Pd, Pt, Ru, SiN, Ti, W, and Zr.

Another embodiment provides a method for controlling thermal bending in an atomic force microscope, the method comprising depositing a dielectric material on a cantilever beam, wherein the dielectric material is thermally stress-matched to the cantilever beam; generating an oscillation of the cantilever beam, wherein the cantilever beam does not bend during thermal loading caused by the oscillation; positioning the cantilever beam over a sample; and applying a laser beam on the cantilever beam. The method may further comprise cooling any of the sample and the cantilever beam, wherein the cooling causes no deflection of the cantilever beam. The method may further comprise heating any of the sample and the cantilever beam, wherein the heating causes no deflection of the cantilever beam. The method may further comprise heating the sample to greater than 60° C. The dielectric material may comprise any of Ti, Cr, and Ge. The method may further comprise depositing the Ti at a rate of 2 Å/s. The method may further comprise depositing the Cr at a rate of 3 Å/s. The method may further comprise depositing the Ge at a rate of 1.5 Å/s. The thermal loading may occur between 25° C. and 100° C.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1A is a schematic diagram illustrating a conventional AFM test apparatus;

FIG. 1B is a schematic diagram illustrating the undesirable thermal deflection effect association with the conventional AFM test apparatus;

FIG. 2 is a schematic diagram illustrating a scanning probe microscope, according to an embodiment herein;

FIG. 3 is a schematic diagram illustrating an atomic force microscope, according to an embodiment herein;

FIG. 4 is a schematic diagram illustrating the atomic force microscope of FIG. 3 scanning a sample, according to an embodiment herein;

FIG. 6D is a flow diagram illustrating a method for heating an atomic force microscope above a threshold level, according to an embodiment herein;

FIG. 6E is a flow diagram illustrating a method for depositing Ti used in constructing an atomic force microscope, according to an embodiment herein;

FIG. 6F is a flow diagram illustrating a method for depositing Cr used in constructing an atomic force microscope, according to an embodiment herein;

FIG. 6G is a flow diagram illustrating a method for depositing Ge used in constructing an atomic force microscope, according to an embodiment herein;

FIG. 7B is a graphical diagram illustrating topological line scan results for an Au coated $SiN_x$ probe; according to an embodiment herein; and FIG. 7C is a graphical diagram illustrating topological line scan results for a Ti/Ge coated $SiN_x$ probe; according to an embodiment herein.

DETAILED DESCRIPTION

Figure 5:
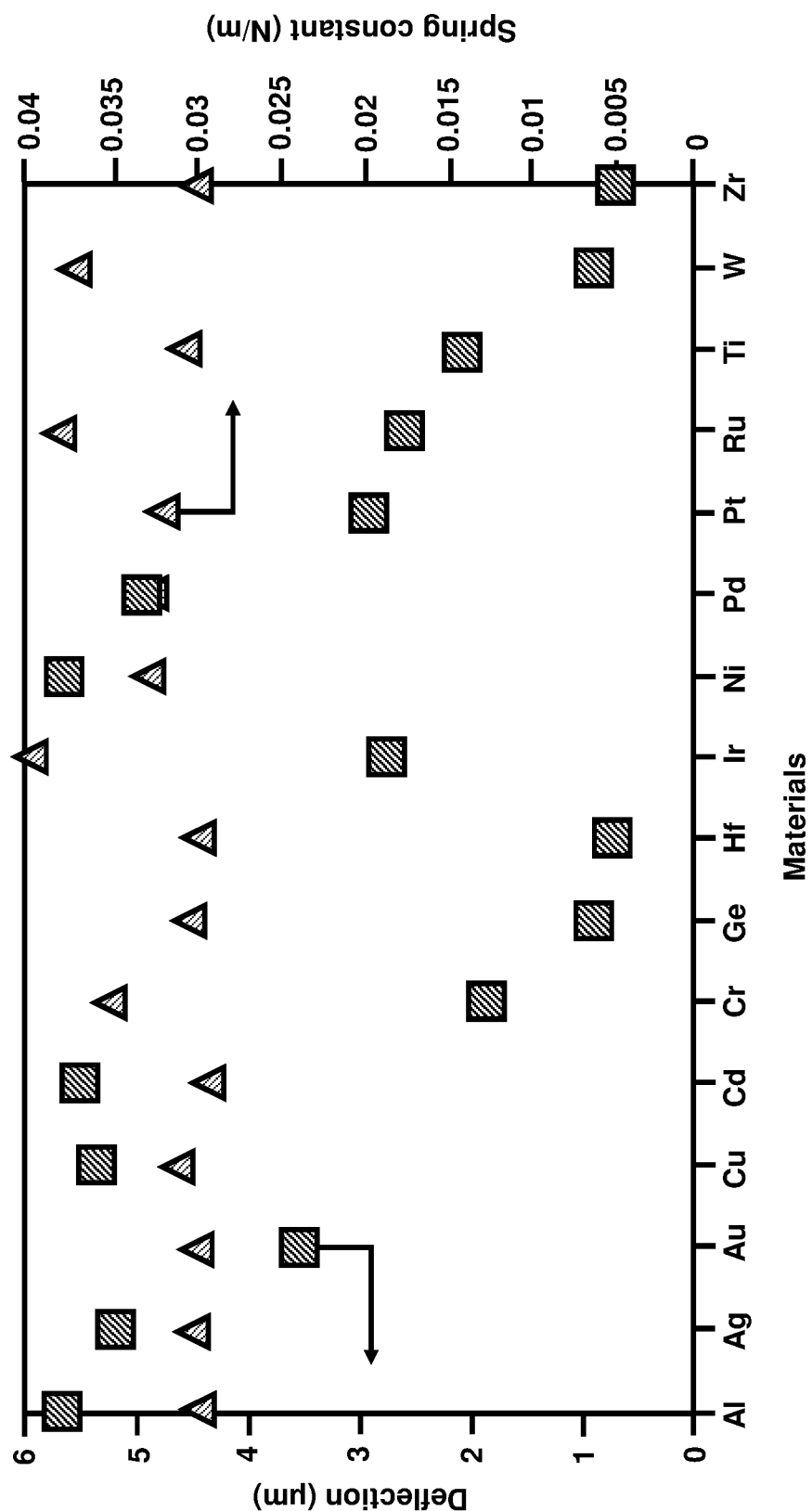
FIG. 5 is a graphical diagram illustrating experimental predicted beam deflections and spring constants for 50 nm of different metals on 550 nm of a $SiN_x$ probe with a ΔT of 75° C., according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a stress-matched high-sensitivity, low thermal deflection SPM and/or AFM configured to provide the ability to experimentally quantify and resolve thermal and/or mechanical nano-scale properties at ambient, elevated, and sub-ambient temperatures. The embodiments herein overcome the limitations of the conventional solutions while providing large area metallization for a high range of sensitivity to topographically induced probe deflection. Referring now to the drawings, and more particularly to FIGS. 2 through 7C, where similar reference characters denote corresponding features consistently throughout the figures, there are shown preferred embodiments. In the drawings, the size and relative sizes of components, layers, and regions, etc. may be exaggerated for clarity.

FIG. 2 illustrates a scanning probe microscope 10 comprising a cantilever structure 15 and a metallization layer 20 on the cantilever structure 15. According to the embodiments herein, the cantilever structure 15 and the metallization layer 20 expand and contract at equivalent rates upon thermal loading. This occurs because the cantilever structure 15 and the metallization layer 20 comprise matching coefficient of thermal expansion (CTE) levels. According to an example, the cantilever structure 15 may comprise SiN. In an example, the metallization layer 20 may comprise 50 nm of Ti. In another example, the metallization layer 20 may comprise 50 nm of Cr. In still another example, the metallization layer 20 may comprise 5 nm of Ti and 45 nm of Ge. While specific thicknesses of the materials for the metallization layer 20 are described above, the embodiments herein are not restricted to these particular thicknesses. According to the embodiments herein, the cantilever structure 15 may comprise no thermally-induced deflections due to the matching CTE with the metallization layer 20, According to the embodiments herein, if the scanning probe microscope 10 or a sample (not shown in FIG. 2) is heated or cooled, then the cantilever structure 15 does not deflect because the metallization layer 20 and the SiN bulk material of the cantilever structure 15 are expanding/contracting at equivalent rates because they are CTE-matched. The scanning probe microscope 10 solves the issue of thermal deflection in high-sensitivity SPM, AFM, and SThM probes, which results from the difference in the coefficient of thermal expansion and stress between the metal (such as gold) and dielectric (such as SiN) materials comprising a bi-morph structure used for the cantilever structure 15.

FIG. 3, with reference to FIG. 2, illustrates an atomic force microscope 50 comprising a cantilever beam 55, a piezoelectric element 60 to generate an oscillation of the cantilever beam 55, and a dielectric material 65 on the cantilever beam 55. The dielectric material 65 is thermally stress-matched to the cantilever beam 55. Moreover, the cantilever beam 55 does not bend during thermal loading caused by the oscillation since the dielectric material 65 is thermally stress-matched to the cantilever beam 55. FIG. 4, with reference to FIGS. 2 and 3, illustrates that a sample 70 may be scanned by the atomic force microscope 50. A laser beam 75 is applied onto (and is deflected from) the cantilever beam 55 to provide measurements of the scanning process (i.e., through deflection and movement on a PSPD (not shown in FIG. 4)).

According to the embodiments herein, the cantilever beam 55 and the dielectric material 65 may expand at equivalent rates upon thermal loading since the dielectric material 65 is thermally stress-matched to the cantilever beam 55. Furthermore, the cantilever beam 55 and the dielectric material 65 may contract at equivalent rates upon thermal loading since the dielectric material 65 is thermally stress-matched to the cantilever beam 55. According to various examples, the dielectric material 65 may comprise any of Al, Ag, Au, Cu, Cd, Cr, Ge, Hf, Jr, Ni, Pd, Pt, Ru, SiN, Ti, W, and Zr. However, other materials may be used in accordance with the embodiments herein.

Table 1 is a list of the different dielectric materials 65 described above including the corresponding bulk CTE value and the corresponding bulk Modulus of Elasticity (E) value. However, materials other than those described above and listed in Table 1 may also be used in accordance with the embodiments herein.

TABLE 1

CTE and E values for various dielectric materials

| Material | CTE ($10^{-6}/°$ $C^{-1}$) | E (GPa) |
|---|---|---|
| Al (Aluminum) | 23 | 70 |
| Ag (Silver) | 18.9 | 83 |
| Au (Gold) | 14 | 79 |
| Cu (Copper) | 16 | 117 |
| Cd (Cadmium) | 30 | 50 |
| Cr (Chromium) | 6.2 | 294 |
| Ge (Germanium) | 6.1 | 103 |
| Hf (Hafnium) | 5.9 | 78 |
| Jr (Iridium) | 6.4 | 528 |
| Ni (Nickel) | 13 | 200 |
| Pd (Palladium) | 11.8 | 198 |
| Pt (Platinum) | 8.8 | 168 |
| Ru (Ruthenium) | 6.4 | 447 |
| $SiN_x$ (Silicon Nitride) | 3.3 | 310 |
| Ti (Titanium) | 8.6 | 116 |
| W (Tungsten) | 4.5 | 411 |
| Zr (Zirconium) | 5.7 | 88 |

Using the values in Table 1, experimental simulations were performed for AT values of 75° C., corresponding to heating the cantilever beam 55 and/or sample 70 from 25-100° C. The results of these experimental simulations are graphically shown in FIG. 5, with reference to FIGS. 2 through 4. The horizontal axis represents the metal material, the primary vertical axis (squares) is the predicted tip deflection of the cantilever beam 55, and the secondary vertical axis (triangles) is the predicted spring constant of the cantilever beam 55. The experimentally predicted spring constant for a standard Au—$SiN_x$ probe is 0.03 N/m. This is consistent with the industry-reported spring constant range (0.005 to 0.04 N/m).

The deposited dielectric material 65 does not significantly impact the experimentally predicted spring constant, and all combinations of the various materials provided in Table 1 fall within the acceptable range of various commercial off-the-shelf (COTS) probes used in the industry. Therefore, from a spring constant perspective, all the dielectric materials 65 provide in Table 1 are acceptable choices for use in accordance with the embodiments herein.

However, there is significantly more spread in the predicted deflection values. A standard Au-coated $SiN_x$ probe is expected to deflect 3.4 μm, which is relatively large, and consistent with deflections reported in the literature. As shown in Table 1, this can be explained by the relatively large difference in CTE between Au ($14 \times 10^{-6}/°$ $C^{-1}$) and SiN ($3.3 \times 10^{-6}/°$ $C^{-1}$). Similarly, several other metals such as Al ($23 \times 10^{-6}/°$ $C^{-1}$), Ag ($18.9 \times 10^{-6}/°$ $C^{-1}$), and Cd ($30 \times 10^{-6}/°$ $C^{-1}$) have predicted deflections approaching 6 μm, primarily due to large CTE mismatch.

Conversely, materials such as Cr ($6.2 \times 10^{-6}/°$ $C^{-1}$), Ge ($6.1 \times 10^{-6}/°$ $C^{-1}$), Hf ($5.9 \times 10^{-6}/°$ $C^{-1}$), Ti ($8.6 \times 10^{-6}/°$ $C^{-1}$), W ($4.5 \times 10^{-6}/°$ $C^{-1}$), and Zr ($5.7 \times 10^{-6}/°$ $C^{-1}$) that have CTE values closer to $SiN_x$ ($3.3 \times 10^{-6}/°$ $C^{-1}$) have predicted deflections ≤2 μm. Combined with agreeable spring constant values, these materials are prime candidates for fabricating low-deflection high-temperature AFMs 50.

Figure 6A:
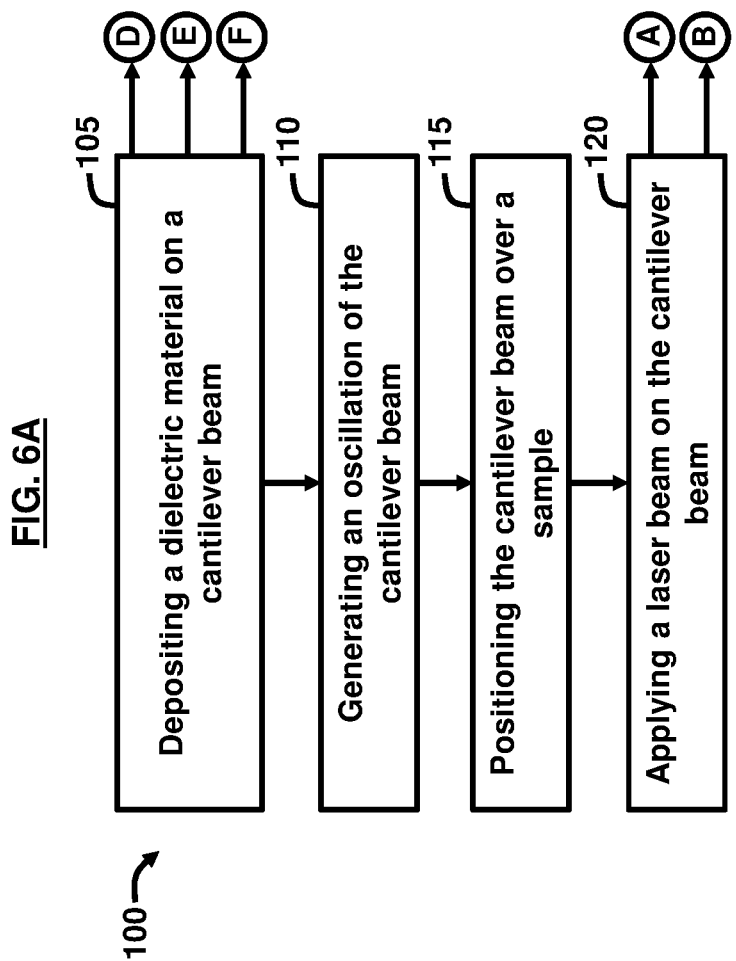
FIG. 6A is a flow diagram illustrating a method for controlling thermal bending in an atomic force microscope, according to an embodiment herein.

FIGS. 6A through 6G, with reference to FIGS. 2 through 5, is a flow diagram illustrating a method 100 for controlling thermal bending in an atomic force microscope 50. As shown in FIG. 6A, the method 100 comprises depositing (105) a dielectric material 65 on a cantilever beam 55, wherein the dielectric material 65 is thermally stress-matched to the cantilever beam 55. Next, the method 100 comprises generating (110) an oscillation of the cantilever beam 55, wherein the cantilever beam 55 does not bend during thermal loading caused by the oscillation. Thereafter, the method 100 comprises positioning (115) the cantilever beam 55 over a sample 70. Then, the method 100 comprises applying (120) a laser beam 75 on the cantilever beam 55.

Figure 6B:
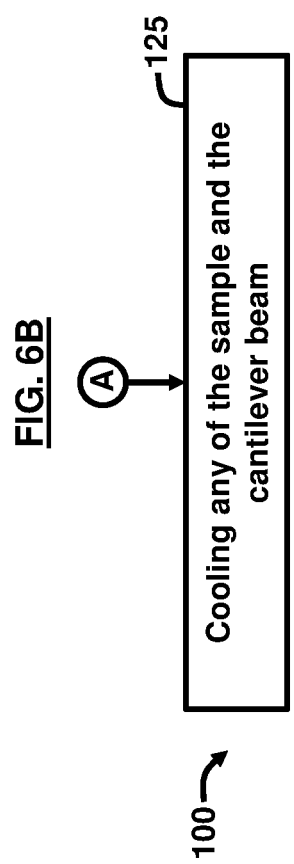
FIG. 6B is a flow diagram illustrating a method for cooling an atomic force microscope, according to an embodiment herein.
Figure 6C:
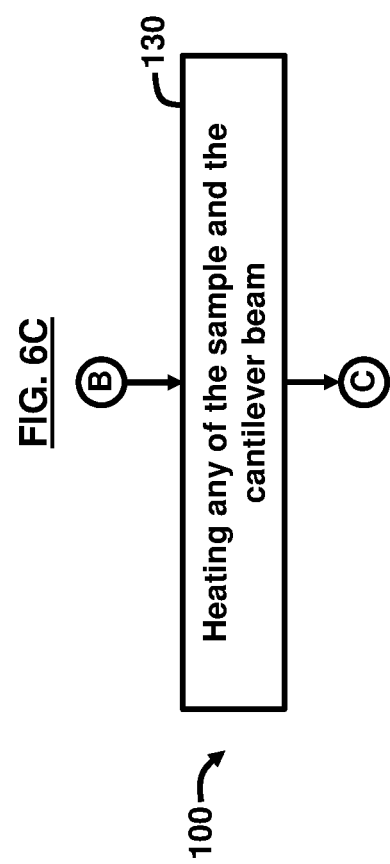
FIG. 6C is a flow diagram illustrating a method for heating an atomic force microscope, according to an embodiment herein.

As shown in FIG. 6B, the method 100 may further comprise cooling (125) any of the sample 70 and the cantilever beam 55, wherein the cooling causes no deflection of the cantilever beam 55. As shown in FIG. 6C, the method 100 may further comprise heating (130) any of the sample 70 and the cantilever beam 55, wherein the heating causes no deflection of the cantilever beam 55. As shown in FIG. 6D, the method 100 may further comprise heating (135) the sample 70 to greater than 60° C.

Based on the above analysis described with reference to Table 1 and FIG. 5, and ease-of-fabrication, three metals may be preferably chosen to be deposited on uncoated $SiN_x$ probes: 50 nm Ti, 50 nm Cr, and 5 nm Ti/45 nm Ge. In the latter case, the Ti is used as an adhesion layer. Accordingly, the dielectric material 65 may comprise any of Ti, Cr, and Ge.

As shown in FIG. 6E, the method 100 may further comprise depositing (140) the Ti at a rate of 2 Å/s. As shown in FIG. 6F, the method 100 may further comprise depositing (145) the Cr at a rate of 3 Å/s. As shown in FIG. 6G, the method 100 may further comprise depositing (150) the Ge at a rate of 1.5 Å/s. The thermal loading may occur between 25° C. and 100° C.

Figure 7A:
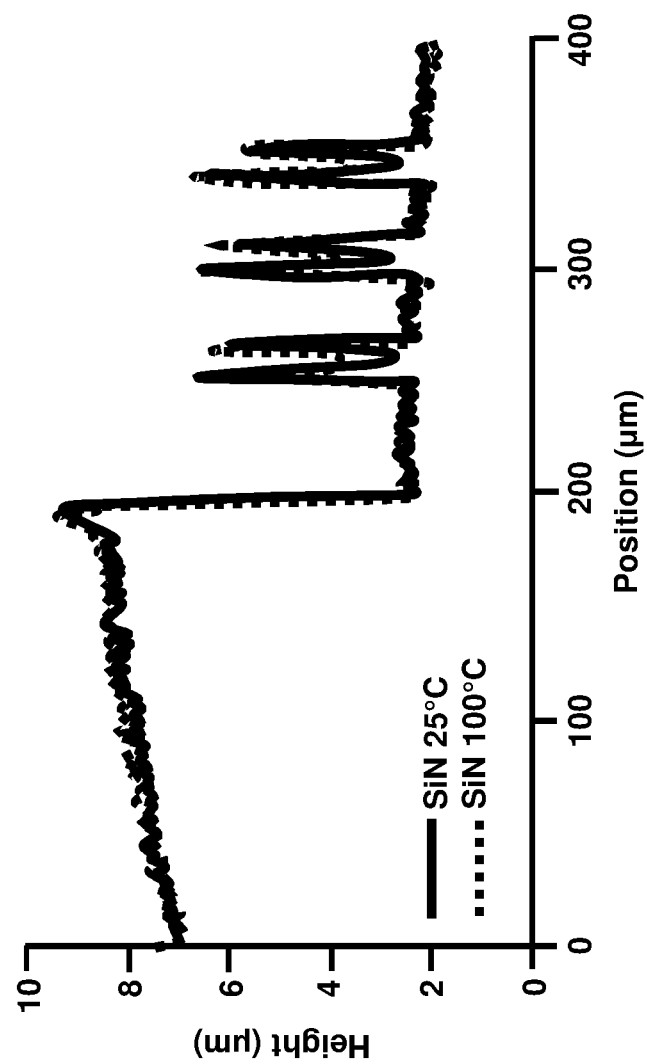
FIG. 7A is a graphical diagram illustrating topological line scan results for a bare $SiN_x$ probe; according to an embodiment herein.

Experimentally, all three materials may be deposited in an electron-beam evaporator. After deposition, the experimental probes were thermally tested using a heated stage and a laser confocal microscope to observe thermal deflection. FIGS. 7A through 7C, with reference to FIGS. 2 through 6E, are summaries of the experimental results.

More specifically, FIGS. 7A through 7C are topological line scans down the length of the probe for the cases of an uncoated $SiN_x$ probe, COTS Au-coated $SiN_x$ probe, and a custom Ti—Ge-coated $SiN_x$ probe, respectively. Experimentally, the Ti- ad Cr-coated probes resulted in large room temperature curvature (bow) after deposition, therefore thermal deflection values are not reported. As shown by the line-scans at 25° C. and 100° C. in FIG. 7A, the uncoated $SiN_x$ probes did not deflect upon thermal loading. This was expected since only one material is present. The height vs. position scan in FIG. 7B for the COTS Au-coated $SiN_x$ probes shows a measured tip deflection of 3.2 μm between the scan at room temperature and the scan at 100° C. this result is consistent with the modeled prediction in FIG. 5. The custom fabricated Ti—Ge-coated $SiN_x$ probe (FIG. 7C) shows minimal deflection (within the noise of the tool) moving from 25° C. and 100° C. Again, these results are predicted well by FIG. 5. At room temperature, the Ti—Ge-coated probe appears to bend 'down' more than the bare and Au-coated samples. This may be due to the residual stress in the Ti and Ge films.

The techniques provided by the embodiments herein provide the advantage of full top coverage of SPM and AFM probes with reflective material and complete temperature insensitivity. The techniques provided by the embodiments herein may be used for contact imaging modes, force modulation microscopy, and liquid operation and more broadly to experimentally quantify and resolve thermal and/or mechanical nano-scale properties of micro- and nano-scale features. Accordingly, the techniques provided by the embodiments herein may be used to create MEMS/NEMS structures made from multi-layered materials, which hold their intended shape under temperature load. As such, some applications include, but are not limited to wide temperature range thermostats, micro- or nano-robotics, and profilometry at elevated or sub-ambient temperature.

SPM methods, including both AFM and SThM, have been developed to experimentally quantify and resolve thermal and/or mechanical nano-scale properties near room temperature. New applications require evaluation of these properties at elevated temperatures. Unfortunately, conventional high-sensitivity Au—$SiN_x$ metal-dielectric bi-morph probes suffer from large thermally-induced deflections (≥2 μm) at elevated temperature due to CTE-mismatch (thermal stress mismatch) between Au and Si layers, making measurements difficult or impossible. To solve this problem, the embodiments herein provide stress-matched high-sensitivity microscopes 10, 50 that eliminate probe bending during thermal loading by utilizing metallization materials comparable to the underlying dielectric material 65. Accordingly, the embodiments herein provide a practical approach to developing SPM probes without thermally-driven deflection.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A scanning probe microscope comprising:
a cantilever structure; and
a metallization layer on the cantilever structure, wherein the cantilever structure and the metallization layer expand and contract at approximately equal rates upon thermal loading wherein the cantilever structure and the metallization layer comprise approximately matching coefficient of thermal expansion levels, wherein the cantilever structure comprises SiN, and wherein the metallization layer comprises 5 nm of Ti and 45 nm of Ge.

2. An atomic force microscope comprising:
a cantilever beam;
a piezoelectric element to generate an oscillation of the cantilever beam; and
a laser reflective material on the cantilever beam, wherein the laser reflective material is thermally stress-matched to the cantilever beam, and wherein the cantilever beam shows minimal bending during thermal loading caused by the oscillation wherein the laser reflective material comprises metallization layers with 50 nm thickness designed for deflection mitigation specifically with 550 nm SiN and any of Ge, Hf, W and Zr.

3. The atomic force microscope of claim 2, wherein the cantilever beam and the laser reflective material expand at approximately equivalent rates upon thermal loading.

4. The atomic force microscope of claim 2, wherein the cantilever beam and the laser reflective material contract at approximately equivalent rates upon thermal loading.

5. A method for controlling thermal bending in an atomic force microscope, the method comprising:
depositing a laser reflective material on a cantilever beam, wherein the laser reflective material is thermally stress-matched to the cantilever beam;
generating an oscillation of the cantilever beam, wherein the cantilever beam shows minimal bending during thermal loading caused by the oscillation;
positioning the cantilever beam over a sample; and
applying a laser beam on the cantilever beam wherein either the cantilever structure comprises SiN and the laser reflective material comprises 5 nm of Ti and 45 nm of Ge, or the laser reflective material comprises metallization layers with 50 nm thickness designed for deflection mitigation specifically with 550 nm SiN and any of Ge, Hf, W and Zr.

6. The method of claim 5, further comprising cooling any of the sample and the cantilever beam, wherein the cooling causes 0.01% change in deflection per degree C. temperature change.

7. The method of claim 5, further comprising heating any of the sample and the cantilever beam, wherein the heating causes 0.01% change in deflection per degree C. temperature change.

8. The method of claim 7, further comprising heating the sample to greater than 60° C.

* * * * *